United States Patent [19]

Patchen, II et al.

[11] 4,452,216
[45] Jun. 5, 1984

[54] EVEN TEMPERATURE INTERCOOLER

[75] Inventors: Paul Patchen, II, Homewood; Colin C. Chen, Lansing, both of Ill.

[73] Assignee: Allis-Chalmers Corporation, Milwaukee, Wis.

[21] Appl. No.: 424,008

[22] Filed: Sep. 27, 1982

[51] Int. Cl.³ .................... F02M 31/00; F28F 1/32
[52] U.S. Cl. .................... 123/563; 123/590; 123/545; 60/599
[58] Field of Search .......... 123/556, 563, 545, 590, 123/542, 546; 60/599; 165/159, 160, 174

[56] References Cited

U.S. PATENT DOCUMENTS

| 1,099,842 | 6/1914 | Cobb | 123/545 |
| 1,154,617 | 9/1915 | Deppe | 123/545 |
| 1,747,361 | 2/1930 | Godward | 123/545 |
| 2,169,564 | 8/1939 | Maher | 165/160 |
| 2,388,213 | 10/1945 | Mock | 123/556 |
| 2,606,006 | 8/1952 | Karlsson | 165/160 |
| 2,612,153 | 9/1952 | Gibler | 165/159 |
| 3,894,392 | 7/1975 | Melchior | 60/599 |
| 4,106,457 | 8/1978 | Totten | 123/590 |
| 4,303,052 | 12/1981 | Manfredo | 123/563 |

FOREIGN PATENT DOCUMENTS 55-96320  7/1980  Japan .................... 60/599

Primary Examiner—Ronald H. Lazarus
Attorney, Agent, or Firm—Arthur L. Nelson

[57] ABSTRACT

A means of evenly distributing the air flow through the core of an intercooler across the total cooling surface of the core.

9 Claims, 6 Drawing Figures

HOT INCOMING INDUCTION AIR

COOLANT OUT

COOLANT IN

HOT AIR STREAM

COOLANT OUT

COOLANT IN

COOLANT OUT

COOLANT IN

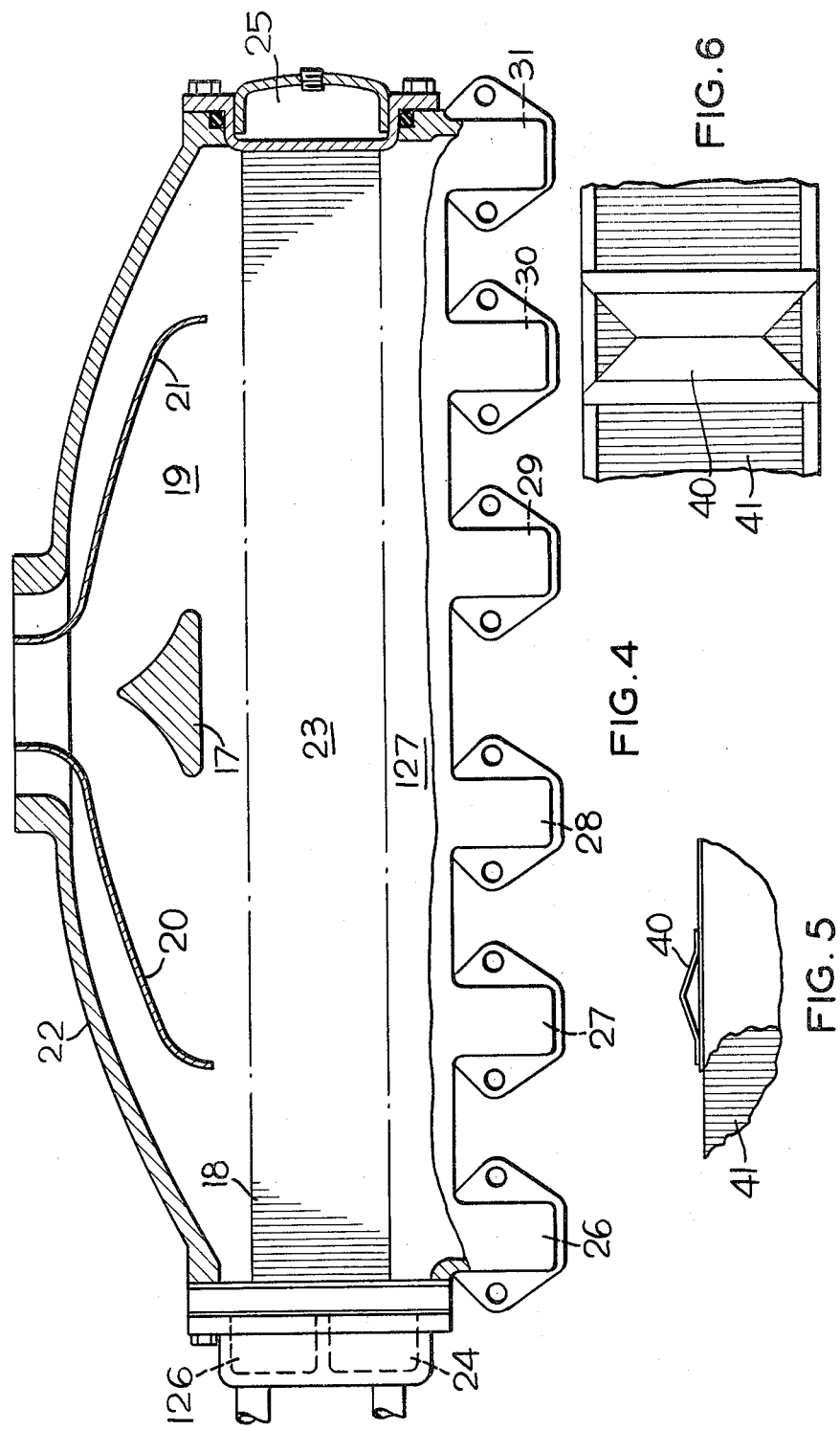

EVEN TEMPERATURE INTERCOOLER

This invention relates to an intercooler for an internal combustion engine and more particularly to a means of directing air evenly across the total cooling surface of the intercooler core.

The conventional intercooler provides for air flow through the cooling core and dissipation of heat to be absorbed by the cooling fluid. Excess heat of the incoming air is carried away by the cooling fluid while the temperature of the incoming air is lowered. The incoming air usually enters the center of the intercooler and then flows through the plenum chamber and the cooling core. Conventionally, the major portion of the air flows through the center portion of the cooling core and consequently this will produce a hot air stream flowing through the center of the intercooler. The cylinders supplied by the hot air stream will operate at higher firing pressure and temperatures. This may become a barrier for increasing the output of the engine. Accordingly, the applicant's invention provides a uniform flow rate through all portions of the cooling core surface. Air deflectors are porvided in the plenum chamber for the intake air to distribute the air over the cooling surface of the cooling core evenly. Accordingly, if the output of the engine is increased by increasing the air intake, the relatively high peak pressures and temperatures in the center area will be eliminated.

The U.S. Pat. No. 4,303,052, Manfredo and Hirsch, entitled "Charge Air Cooler Mounting Arrangement" shows an intercooler for an internal combustion engine. Air is brought in centrally to the plenum chamber and passed through the intercooler core. No provision is made for evenly distributing the air over the total area of the intercooler core. The applicants provide for even distribution of the air flow over the total core surface to eliminate heat zones and causing some cylinders to operate at higher firing temperatures than others.

It is an object of this invention to provide an intercooler for an internal combustion engine having a deflector for directing uniform air flow through all portions of the intercooler core.

It is another object of this invention to provide an intercooler having an air flow divider and air deflectors in the plenum chamber to direct incoming air for even distribution over the cooling core and uniform flow rate across the total cooling surface of the cooling core.

Objects of this invention are accomplished by controlling the air flow through the plenum chamber and across the cooling surface of the intercooler core. Positioned within the plenum chamber is an air divider which directs the air flow laterally within the plenum chamber to avoid the concentration of the air flow directly through the center of the cooling core. Deflectors are also provided to more evenly distribute the air across the total cooling surface of the cooling core. The deflectors and the air dividers in the plenum chamber produce a uniform flow in all portions of the plenum chamber allowing the uniform rate of flow over all areas of the cooling surface and avoiding any peak temperature buildup in any portion of the intercooler.

Referring to the drawings, the preferred embodiment of this invention is illustrated.

FIG. 1 illustrates a conventional intercooler and its operation with the major portion of the air flow through the center of the intercooler;

FIG. 2 generally illustrates the applicants' invention;

FIG. 4 is a cross-sectional view of the applicants' invention with an air divider and air deflectors;

FIG. 5 illustrates a modification of an air divider; and

FIG. 6 is a plan view of the modification shown in FIG. 5.

Figure 1:
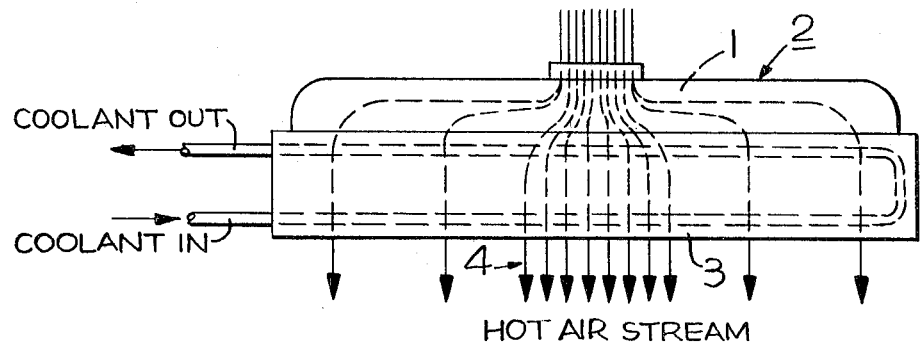

Referring to FIG. 1, compressed air from the supercharger is shown entering the plenum chamber 1 of the intercooler 2. Normally, the air flow has a tendency to flow through the center of the cooling core 3 producing a hot air stream at the center as shown at 4. The hot air stream in a conventional 6-cylinder engine will flow to the two center cylinders and cause high firing temperatures of these cylinders. It is desirable to have an even firing temperature on all cylinders not only for greater efficiency but to permit increased air flow to the cylinders and avoid peak temperatures on any one of the cylinders.

Figure 2:
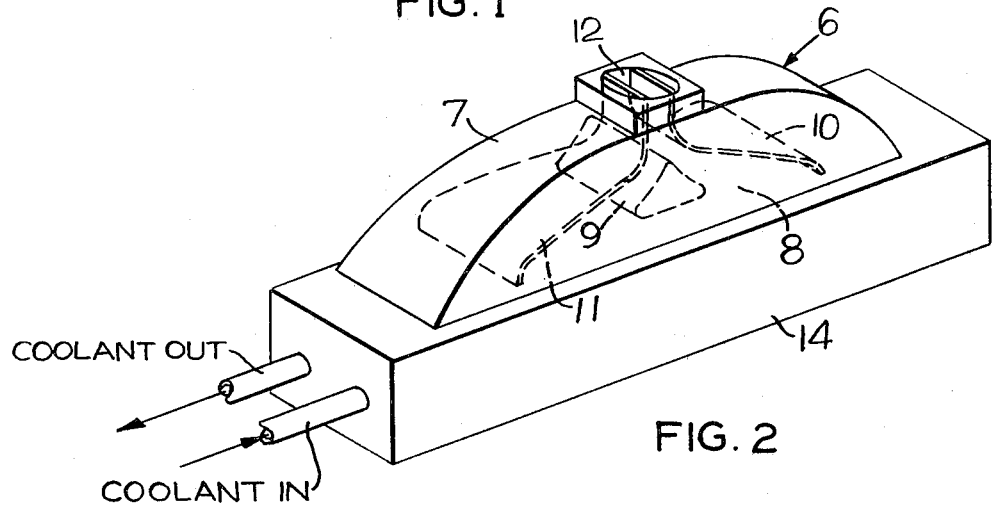

FIG. 2 generally illustrates the principle involved in the applicants' invention. The intercooler 6 includes the housing 7 enclosing the plenum chamber 8. Within the plenum chamber 8 is positioned an air divider 9 and deflectors 10 and 11 on each side of the divider 9. These deflectors extend from the inlet passage 12 and prevent the air flow from passing through the center of the cooling core 14. This is more clearly illustrated in FIG. 3 in which the incoming air stream 15 is directed for uniform flow through the cooling core 14. Air divider 9 and the deflectors 10 and 11 produce a distribution of the air flow for uniform rate of flow through the cooling core as indicated.

FIG. 4 illustrates the invention in which a divider 17 is positioned centrally over the cooling core 18 to direct the air flow laterally within the plenum chamber 19. The deflectors 20 and 21 also assist to distribute the air flow over the total surface of the intercooler core. A housing 22 forms the plenum chamber 19. The cooling core 18 is mounted within the core chamber 23 and is fastened at both ends. Coolant flows into the inlet chamber 24 and is recirculated back through the core from the return chamber 25 and is returned to the cooling system through the outlet chamber 126. Incoming air passes through the plenum chamber 19 and then through the cooling core 18. When it is passed through the cooling core 18, it is received in the air intake chamber 27. The air intake chamber 127 supplies intake air to the six intake passages 26, 27, 28, 29, 30 and 31. Each of these intake passages supplies a cylinder in the 6-cylinder engine.

FIGS. 5 and 6 show a modification of the air divider 40 on an intercooler core 41. A portion of the air is allowed to flow under the divider while the remaining air flow is directed toward both ends of the intercooler.

The operation of the device will be described in the following paragraphs.

Figure 3:
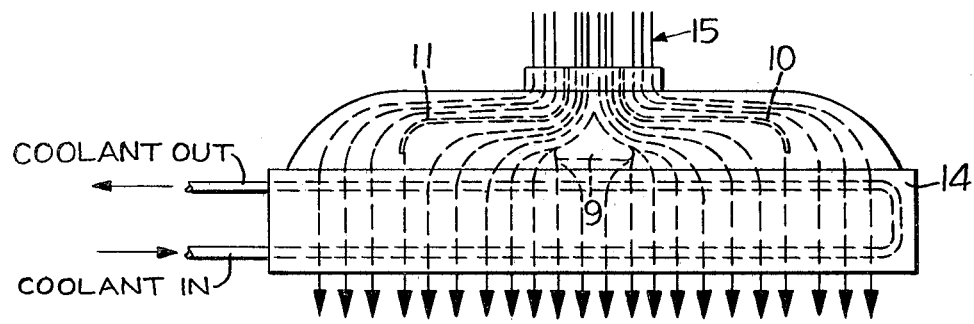
FIG. 3 illustrates generally the operation of the applicants' invention.

The conventional intercooler is illustrated in FIG. 1 showing the air flow having a tendency to flow through the center portion of the cooling core. This causes a hotter air stream producing a peak temperature zone in the middle portion of the intercooler. Since the combustion chambers of the cylinders for the internal combustion engine are supplied from the air as it is passed through the cooling core, there is a tendency for the two center cylinders to operate at higher firing temperatures. This is not only undesirable for the efficiency of the engine but also when the engine is supercharged for greater power output the peak temperature zone can produce a limiting factor in the total output of the engine. Accordingly, the applicants' invention has an air flow divider 9 and air deflectors 10 and 11 which distribute the air over the total surface of the cooling core. The air flow is generally illustrated in FIG. 3 in which a uniform flow through all portions of the cooling core is illustrated. This eliminates any peak temperature zone or a hot air stream supplying any one cylinder compared to another. Accordingly, the applicants' invention provides for even distribution of the air and a uniform flow rate of the air through the cooling core to provide greater engine efficiency and a greater range for increasing the power output of the engine through supercharging and intercooling.

The embodiments of the invention in which an exclusive property or privilege is claimed are defined as follows:

1. An intercooler on an internal combustion engine comprising, an internal combustion engine, an intercooler including a housing defining an inlet passage and an inlet plenum chamber, said housing defining an air supply chamber adapted for supplying air to the combustion chambers of the internal combustion engine, an intercooler core chamber intermediate said plenum chamber and said air supply chamber, an intercooler core in said intercooler core chamber, a source of coolant on said engine connected to said intercooler core, deflector means extending from said inlet passage into said plenum chamber including at least two deflectors extending downwardly and outwardly from said inlet passage toward the housing walls and an air flow divider intermediate the deflectors downstream of the inlet passage for guiding incoming air from said inlet passage for uniform distribution of air to all portions of the intercooler cooling surfaces and uniform cooling of air flow through the intercooler.

2. An intercooler on an internal combustion engine as set forth in claim 1, wherein said deflector means defines essentially a plurality of passages from said inlet passage to said intercooler core.

3. An intercooler on an internal combustion engine as set forth in claim 1, wherein said deflector means includes two air deflectors laterally of said divider for providing even distribution of air over said intercooler core.

4. An intercooler on an internal combustion engine as set forth in claim 1, wherein said housing means defines plural outlet passages from said air supply chamber adapted for connection to a plurality of cylinders in said internal combustion engine.

5. An intercooler on an internal combustion engine as set forth in claim 1 including, means defining a central positioning of said inlet passage in connection with said plenum chamber.

6. An intercooler on an internal combustion engine as set forth in claim 1, wherein said deflector means define partitions extending from said inlet passage into said plenum chamber for controlling the distribution of air flow across said intercooler core.

7. An intercooler on an internal combustion engine as set forth in claim 1, wherein said deflector means essentially defines a plurality of air passages extending from said inlet passage to said intercooler core with cross-sectional areas of the passages at the inlet passage being proportional to the cross-sectional areas near the intercooler core for distributing incoming air across the cooling surface of said intercooler core for a uniform flow rate through all portions of said intercooler core.

8. An intercooler on an internal combustion engine as set forth in claim 1, wherein the housing of said plenum chamber and said deflector means define at least four passage means from said inlet passage to said intercooler core.

9. An intercooler on an internal combustion engine as set forth in claim 1, wherein said housing of said plenum chamber forms an integral structure with said deflector means.

* * * * *